US010214934B2

(12) United States Patent
Hunt et al.

(10) Patent No.: US 10,214,934 B2
(45) Date of Patent: Feb. 26, 2019

(54) BANNER FRAME WITH ANCHOR STAKES

(71) Applicants: Britt P. Hunt, Nashville, TN (US); Roy C. Chaffin, Jr., Hendersonville, TN (US); Douglas J. Sanford, Mt. Juliet, TN (US); Scott Cavanaugh, Nashville, TN (US)

(72) Inventors: Britt P. Hunt, Nashville, TN (US); Roy C. Chaffin, Jr., Hendersonville, TN (US); Douglas J. Sanford, Mt. Juliet, TN (US); Scott Cavanaugh, Nashville, TN (US)

( * ) Notice: Subject to any disclaimer, the term of this patent is extended or adjusted under 35 U.S.C. 154(b) by 0 days.

(21) Appl. No.: 15/786,777

(22) Filed: Oct. 18, 2017

(65) Prior Publication Data

US 2018/0195304 A1 Jul. 12, 2018

Related U.S. Application Data

(60) Provisional application No. 62/409,401, filed on Oct. 18, 2016.

(51) Int. Cl.

| | |
|---|---|
| ***F16M 13/00*** | (2006.01) |
| ***E04H 12/22*** | (2006.01) |
| ***G09F 15/00*** | (2006.01) |
| ***G09F 17/00*** | (2006.01) |

(52) U.S. Cl.

CPC ..... *E04H 12/2215* (2013.01); *G09F 15/0012* (2013.01); *G09F 17/00* (2013.01); *G09F 2017/0041* (2013.01)

(58) Field of Classification Search

USPC .......................................................... 248/545

See application file for complete search history.

(56) References Cited

U.S. PATENT DOCUMENTS

| | | | | | |
|---|---|---|---|---|---|
| 2,872,750 | A * | 2/1959 | Holcomb | G09F 7/00 | 40/606.19 |
| 4,092,792 | A * | 6/1978 | Vorhees | G09F 1/12 | 40/606.13 |
| 4,795,137 | A * | 1/1989 | Witt | E04H 17/08 | 256/1 |
| 4,885,860 | A * | 12/1989 | Huenefeld | G09F 7/18 | 40/606.18 |
| 4,894,937 | A * | 1/1990 | Davis | G09F 7/18 | 248/248 |
| 4,916,840 | A * | 4/1990 | Getz | G09F 7/00 | 40/605 |
| 5,082,231 | A * | 1/1992 | Knowles | E04H 12/2215 | 173/129 |
| 5,083,390 | A * | 1/1992 | Edman | G09F 7/18 | 40/607.02 |
| 5,881,495 | A * | 3/1999 | Clark | A01G 9/12 | 135/118 |
| 5,881,978 | A * | 3/1999 | Rust | E04H 12/2215 | 109/52 |

(Continued)

*Primary Examiner* — Monica E Millner

(74) *Attorney, Agent, or Firm* — Wayne Edward Ramage; Baker Donelson

(57) ABSTRACT

A banner frame mounted on two or more anchor stakes or spikes. The anchor stakes are configured to provide a natural anchor once driven into the ground, thereby preventing the typical leaning, bending or bowing of the posts that leads to sagging of the banner. A single anchor stake or spike may also be to support a single post for applications where a single post is needed.

18 Claims, 2 Drawing Sheets

(56) References Cited

U.S. PATENT DOCUMENTS

| | | | | |
|---|---|---|---|---|
| 6,311,428 | B1 * | 11/2001 | Marino | A01G 9/12<br>256/65.05 |
| 6,461,084 | B1 * | 10/2002 | Stuart | E04H 12/2215<br>248/156 |
| 6,629,389 | B1 * | 10/2003 | Rust | G09F 7/18<br>248/551 |
| 6,718,669 | B1 * | 4/2004 | Hayes | G09F 15/0062<br>40/603 |
| 7,546,992 | B1 * | 6/2009 | Cappolina | G09F 15/0012<br>248/165 |
| 7,866,074 | B2 * | 1/2011 | McComb | B43K 23/001<br>160/135 |
| 9,633,585 | B1 * | 4/2017 | Hanes | G09F 15/0012 |
| 2014/0026454 | A1 * | 1/2014 | Weis | G09F 15/00<br>40/610 |
| 2017/0053571 | A1 * | 2/2017 | Wormser | G09F 15/0025 |

* cited by examiner

BANNER FRAME WITH ANCHOR STAKES

This application claims priority to and benefit of U.S. Provisional Application 62/409,401 filed Oct. 18, 2016, by Britt P. Hunt, et al., and is entitled to the benefit of that filing date. The complete disclosure, appendices, specification, and figures of U.S. Provisional Application 62/409,401 are incorporated herein by specific reference for all purposes.

FIELD OF INVENTION

This invention relates to a system and apparatus for installing and anchoring a banner.

BACKGROUND OF THE INVENTION

Banners, such as, but not limited to, yard banners, typically are suspended between two posts. This arrangement leads to banners sagging over time, due to unstable, flimsy posts, improper attachment of the banner to the posts, or combinations thereof. Accordingly, what is needed is a system for displaying banners that eliminates sagging of the banner over time.

SUMMARY OF THE INVENTION

In various exemplary embodiments, the present system comprises a banner frame mounted on two or more anchor stakes or spikes. The anchor stakes are configured to provide a natural anchor once driven into the ground, thereby preventing the typical leaning, bending or bowing of the posts that leads to sagging of the banner. A single anchor stake or spike may also be used to support a single post for applications where a single post is needed.

In several embodiments, the anchor stake comprises an upper end and a lower end. The upper end comprises a post to which a banner frame or banner may be attached or mounted. The lower end comprises a plurality of flanges that extend from the stake at angles. The flanges may be evenly spaced every 90-degrees around the stake, although the relative positioning and angles may differ.

The flanges may be of any suitable shape. In some embodiments, the lower part of each flange angles upward and outward from the point of origination, thereby providing an angled edge for assisting in insertion into the ground. In one exemplary embodiment, each flange may comprise one or more holes or cut-outs that are designed to resist the anchor stake from being pulled out of the ground (such as by earth extending into and through the holes or cut-outs). The holes or cut-outs can be circular, oval, triangular, rectilinear, another shape, or combinations thereof. Alternatively, the face of each flange comprises a plurality of directionally-biased upward facing extensions, triangles, or points that are designed to resist the anchor stake from being pulled out of the ground. The extensions, triangles or points may appear on one or both sides of a flange face, on the upper or lower part of the flange (or both), and on some or all of the flanges.

The anchor stake flanges can be positioned at any angle with respect to the plane formed by the banner frame or banner when mounted on the anchor stakes or banner frame. In several embodiments, the anchor stake flanges are designed to be positioned, when the stake is inserted into the ground, at a specific angle to said plane. In one exemplary embodiment, the flanges are set at 45-degree angles with respect to this plane, thereby providing resistance to movement of the anchor stake along the most common force vectors (i.e., perpendicular to the plane, such as from a strong wind blowing on the banner, or parallel to the plane, such as from the weight of the banner pulling inward). This orientation is established by the placement of the banner mounting holes or connection points in the upper part of the anchor stake and banner frame. The enhanced stability of the anchor stakes and banner frame helps to prevent sagging of the banner over time.

In one exemplary embodiment, some or all of the flanges extend all the way to the tip of the lower end of the anchor stake. This enhances stability at the soil surface by minimizing the amount of displaced or disturbed earth when the anchor stake is initially inserted and driven into the ground.

The upper end of the anchor stake comprises a post. The post may be circular, square, rectilinear, or polygonal in cross-section. In one exemplary embodiment, the post extends sufficiently high above the ground surface so that the banner can be attached directly thereto. One or more horizontal cross-pieces may extend between posts for additional lateral stability.

In another exemplary embodiment, the post serves as a mount for an end of a banner frame. The banner frame may be of multi-part or unitary construction, and its component parts may be circular, square, rectilinear, or polygonal in cross-section. In one exemplary embodiment, the invention comprises a multi-part banner frame, with two support rods (i.e., left and right) and a three-part horizontal top section (with 90-degree angled connection ends adapted to connect to the top of the corresponding support rods). The support rods are mounted on the anchor stake posts, and secured thereto by bolts or the similar fasteners. The horizontal top section is mounted on the support rods, and similarly secured there by bolts or similar fasteners. The support rods or top section may further comprise a series of holes therethrough, generally in the plane of the assembled banner frame, for mounting of frame connectors, such as eyebolts. Eyebolts or similar frame connection points also may be used in place of some or all of the bolts or similar fasteners securing the support rods to the horizontal top section or to the anchor stake posts. Similar connection points also would be used in the embodiment where the banner is directly attached to the anchor stake posts. Alternatively, connection points may be integral parts of the support rods or other components.

After the banner frame is secured in place, the banner is attached or mounted thereto. The banner may be connected to the connection points on the posts or banner frame by any suitable means, including, but not limited to, hooked, cords, bands, bungee cords, or the like. In one embodiment, the present invention uses springs, thereby allowing for more subtle, controlled movement of the banner, and thereby maintaining tension to prevent banner sagging. In one exemplary embodiment, the banner is connected to appropriate connection points at each corner of the banner, and the middle of the top of the banner also may be connected to the horizontal top section or support of the frame by use of a spring, hook, or similar suitable means as described above.

The above apparatus may be of any suitable size or dimension, may be of any color or natural finish, and its components made of any suitable material, including, but not limited to, steel, aluminum, metal, composite, wood, plastic, or combinations thereof. In several embodiment, the size of the banner frame may be adjustable, such as by removing or adding pieces to the horizontal top section or support rods, or by using different lengths of springs or other connection means.

DETAILED DESCRIPTION OF EXEMPLARY EMBODIMENTS

In various exemplary embodiments, the present system comprises a banner frame 10 mounted on two or more anchor stakes or spikes 20. The anchor stakes are configured to provide a natural anchor once driven into the ground, thereby preventing the typical leaning, bending or bowing of the posts that leads to sagging of the banner. A single anchor stake or spike may also be used to support a single post for applications where a single post is needed.

Figure 2:
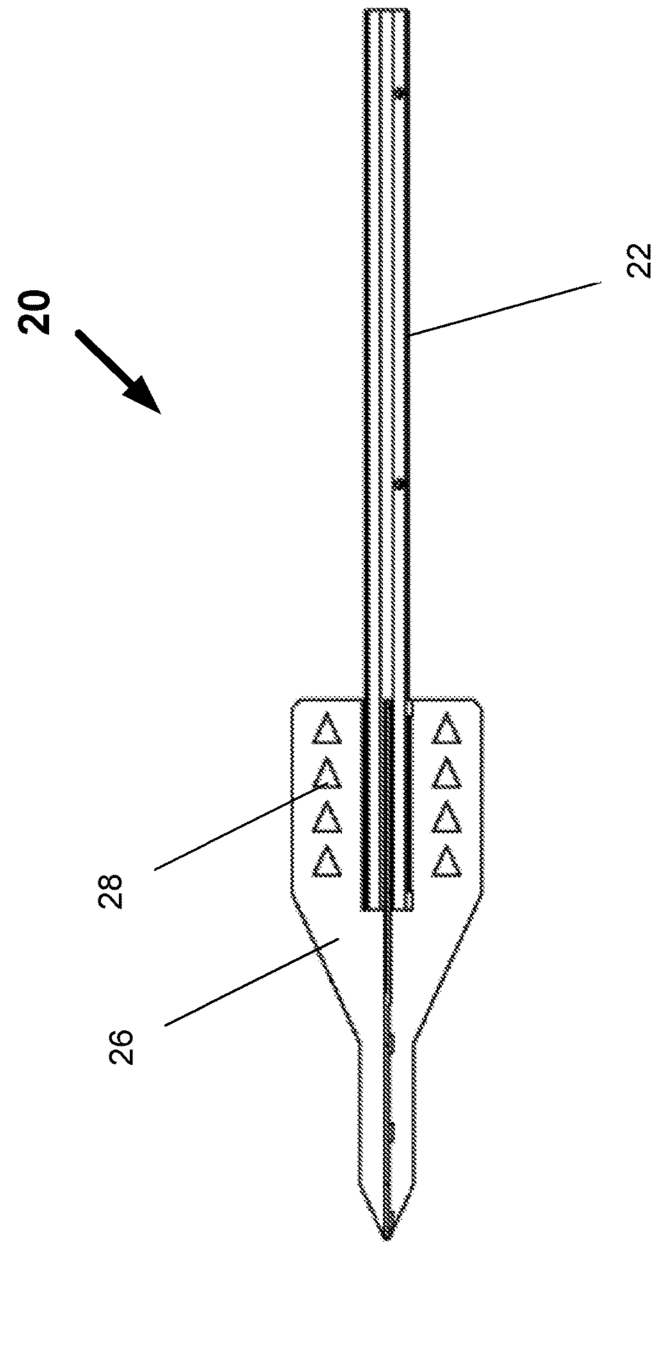
FIG. 2 shows a view of an exemplary anchor stake.

In one exemplary embodiment, as seen in FIG. 2, the anchor stake comprises an upper end and a lower end. The upper end comprises a post 22 to which a banner frame or banner may be attached or mounted. The lower end 24 comprises a plurality of flanges 26. Four flanges are shown in the figure, although the number of flanges can vary. The flanges extend from the stake at angles. While the flanges are shown at being evenly spaced every 90-degrees around the stake, the relative positioning and angles may differ.

The flanges may be of any suitable shape. In the embodiment shown in FIG. 2, the lower part of each flange angles upward and outward from the point of origination, thereby providing an angled edge for assisting in insertion into the ground. In one exemplary embodiment, each flange may comprise one or more holes or cut-outs 28 that are designed to resist the anchor stake from being pulled out of the ground (such as by earth extending into and through the holes or cut-outs). The holes or cut-outs can be circular, oval, triangular, rectilinear, another shape, or combinations thereof. Alternatively, the face of each flange comprises a plurality of directionally-biased upward facing extensions, triangles, or points 28, that are designed to resist the anchor stake from being pulled out of the ground. The extensions, triangles or points may appear on one or both sides of a flange face, on the upper or lower part of the flange (or both), and on some or all of the flanges.

The anchor stake flanges can be positioned at any angle with respect to the plane formed by the banner frame or banner when mounted on the anchor stakes or banner frame. In several embodiments, the anchor stake flanges are designed to be positioned, when the stake is inserted into the ground, at a specific angle to said plane. In one exemplary embodiment, the flanges are set at 45-degree angles with respect to this plane, thereby providing resistance to movement of the anchor stake along the most common force vectors (i.e., perpendicular to the plane, such as from a strong wind blowing on the banner, or parallel to the plane, such as from the weight of the banner pulling inward). This orientation is established by the placement of the banner mounting holes or connection points in the upper part of the anchor stake and banner frame (as described below). The enhanced stability of the anchor stakes and banner frame helps to prevent sagging of the banner over time.

In one exemplary embodiment, some or all of the flanges extend all the way to the tip of the lower end of the anchor stake. This enhances stability at the soil surface by minimizing the amount of displaced or disturbed earth when the anchor stake is initially inserted and driven into the ground.

The upper end of the anchor stake comprises a post 22. The post may be circular, square, rectilinear, or polygonal in cross-section. In one exemplary embodiment, the post extends sufficiently high above the ground surface so that the banner can be attached directly thereto. One or more horizontal cross-pieces may extend between posts for additional lateral stability.

Figure 1:
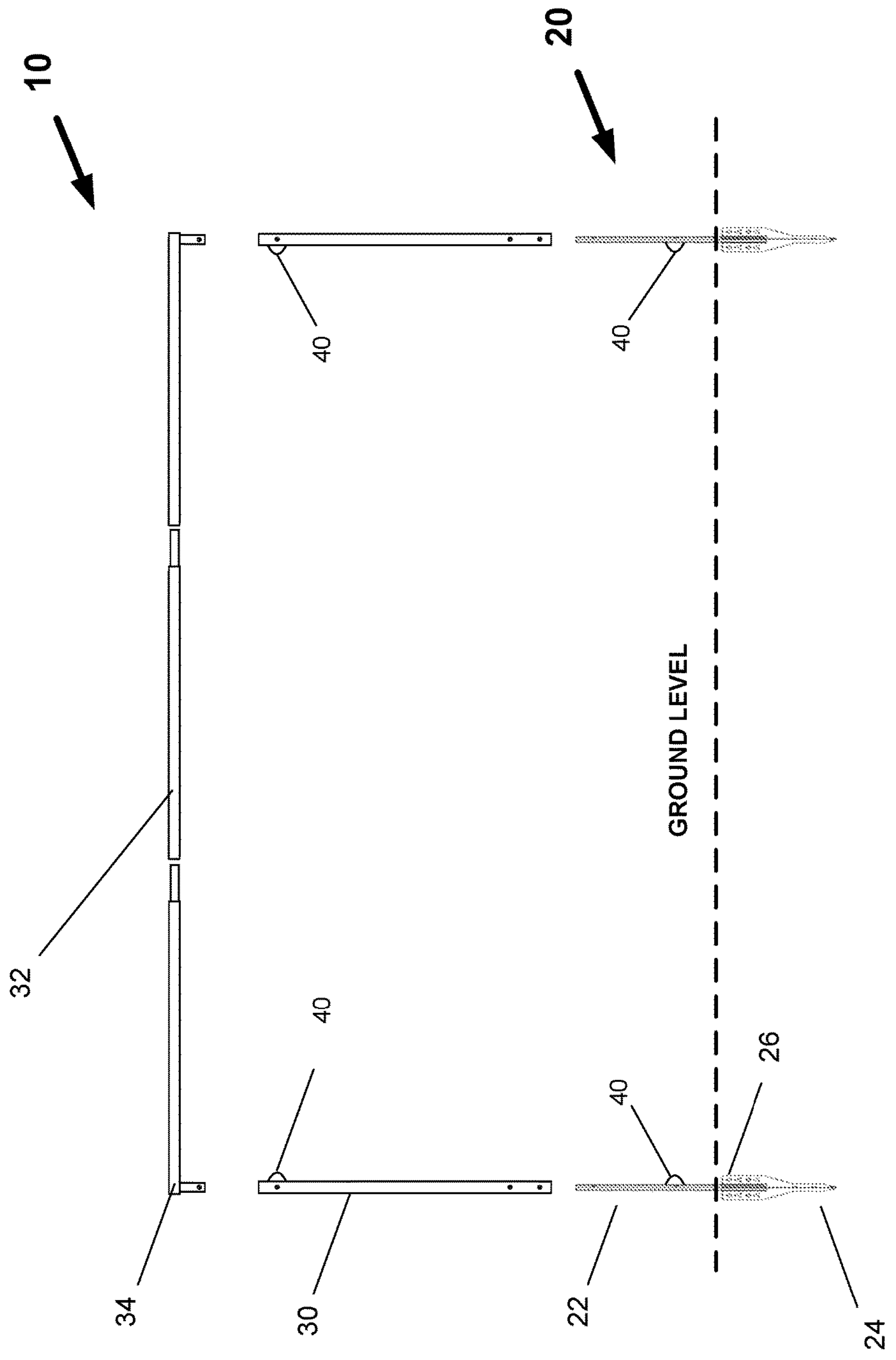
FIG. 1 shows a view of a frame in accordance with an exemplary embodiment of the present invention.

In another exemplary embodiment, the post serves as a mount for an end of a banner frame. The banner frame may be of multi-part or unitary construction, and its component parts may be circular, square, rectilinear, or polygonal in cross-section. FIG. 1 shows a multi-part banner frame, with two support rods 30 (i.e., left and right) and a three-part horizontal top section 32 (with 90-degree angled connection ends 34 adapted to connect to the top of the corresponding support rods). The support rods are mounted on the anchor stake posts, and secured thereto by bolts or the similar fasteners. The horizontal top section is mounted on the support rods, and similarly secured there by bolts or similar fasteners. The support rods or top section may further comprise a series of holes therethrough, generally in the plane of the assembled banner frame, for mounting of frame connectors 40, such as eyebolts. Eyebolts or similar frame connection points also may be used in place of some or all of the bolts or similar fasteners securing the support rods to the horizontal top section or to the anchor stake posts. Similar connection points also would be used in the embodiment where the banner is directly attached to the anchor stake posts. Alternatively, connection points may be integral parts of the support rods or other components.

After the banner frame is secured in place, the banner is attached or mounted thereto. The banner may be connected to the connection points 40 on the posts or banner frame by any suitable means, including, but not limited to, hooked, cords, bands, bungee cords, or the like. In one embodiment, the present invention uses springs, thereby allowing for more subtle, controlled movement of the banner, and thereby maintaining tension to prevent banner sagging. In one exemplary embodiment, the banner is connected to appropriate connection points at each corner of the banner, and the middle of the top of the banner also may be connected to the horizontal top section or support of the frame by use of a spring, hook, or similar suitable means as described above.

The above apparatus may be of any suitable size or dimension, may be of any color or natural finish, and its components made of any suitable material, including, but not limited to, steel, aluminum, metal, composite, wood, plastic, or combinations thereof. In several embodiment, the size of the banner frame may be adjustable, such as by removing or adding pieces to the horizontal top section or support rods, or by using different lengths of springs or other connection means.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A banner frame, comprising:

a horizontal support section with a first end and a second end;

a first vertical support with a top end and a bottom end, the top end supporting the first end of the horizontal support section, and the bottom end mounted on a first anchor stake;

a second vertical support with a top end and a bottom end, the top end support the second end of the horizontal support section, and the bottom end mounted on a second anchor stake;

wherein the first and second anchor stakes each comprise a longitudinal axis and a lower end with a plurality of flanges spaced circumferentially around the lower end and extending at an angle therefrom;

wherein each flange of said plurality of flanges comprises a first section with a first width and first outer edge substantially parallel to the longitudinal axis, a second section immediately below the first section with a second width and a second outer edge angled with respect to the longitudinal axis, a third section immediately below the second section with a third width and a third outer edge substantially parallel to the longitudinal axis, and a fourth section immediately below the third section with a fourth width and a fourth outer edge angled with respect to the longitudinal axis;

further wherein the first width is greater than the third width, the second width varies from a maximum where the first outer edge and second outer edge meet, to a minimum where the second outer edge and third outer edge meet.

2. The banner frame of claim 1, further wherein at least one of said plurality of flanges on the first or second anchor stake comprises removal resistance means disposed on the first section of said at least one of said plurality of flanges.

3. The banner frame of claim 2, wherein said removal resistance means comprises one or more holes or cut-outs extending through the flange.

4. The banner frame of claim 2, wherein said removal resistance means comprises one or more directionally-biased extensions or points on one or more faces of the flange.

5. The banner frame of claim 4, wherein the directional-biased extensions or points extend upwards away from the lower end of the anchor stake.

6. The banner frame of claim 1, wherein the first and second anchor stakes each comprise an upper end with a mounting post.

7. The banner frame of claim 1, wherein the horizontal support section, the first vertical support, and the second vertical support form a plane.

8. The banner frame of claim 7, wherein at least one flange on the first anchor stake and at least one flange on the second anchor stake is not parallel to the plane.

9. The banner frame of claim 7, wherein at least one flange on the first anchor stake and at least one flange on the second anchor stake is at approximately right angles to the plane.

10. The banner frame of claim 1, wherein there are at least four flanges on the first anchor stake and at least four flanges on the second anchor stake.

11. An anchor stake for a banner frame, comprising:

a stake with a longitudinal axis, a lower end adapted for insertion into ground, and an upper end extending aboveground; and a plurality of flanges extending outwardly from the lower end, each flange comprising a first face and a second face, a first section with a first width and first outer edge substantially parallel to the longitudinal axis, a second section immediately below the first section with a second width and a second outer edge angled with respect to the longitudinal axis, a third section immediately below the second section with a third width and a third outer edge substantially parallel to a longitudinal axis, and a fourth section immediately below the third section with a fourth width and a fourth outer edge angled with respect to the longitudinal axis, wherein the first width is greater than the third width, the second width varies from a maximum where the first outer edge and second outer edge meet, to a minimum where the second outer edge and third outer edge meet;

wherein at least one of said plurality of flanges comprises removal resistance means disposed on the first section of said at least one of said plurality of flanges.

12. The anchor stake of claim 11, wherein said removal resistance means comprises one or more holes or cut-outs extending through the flange.

13. The anchor stake of claim 11, wherein said removal resistance means comprises one or more directionally-biased extensions or points on one or more faces of the flange.

14. The anchor stake of claim 11, wherein the directional-biased extensions or points extend upwards away from the lower end of the anchor stake.

15. The anchor stake of claim 11, wherein the plurality of flanges are evenly spaced around the lower end.

16. The anchor stake of claim 11, wherein the plurality of flanges extend only partially along the length of the lower end of the anchor stake.

17. The anchor stake of claim 11, wherein the anchor stake has a longitudinal axis and each flange of said plurality of flanges comprise a bottom end extending from the anchor stake at an acute angle with respect to the longitudinal axis, and a top end extending from the anchor stake at approximately a right angle with respect to the longitudinal axis.

18. The anchor stake of claim 17, wherein there are four flanges.

* * * * *